Patented Nov. 15, 1927.

1,649,381

UNITED STATES PATENT OFFICE.

FRANÇOIS BILLON, OF PARIS, FRANCE.

PURIFICATION OF VACCINES.

No Drawing. Application filed June 2, 1926, Serial No. 113,347, and in France June 6, 1925.

The present invention concerns itself with the purification of vaccines.

The preparation of vaccines has recently grown in volume and in importance so as to constitute a veritable industry. In the large scale operations employed at present, it is necessary to manipulate large masses of materials and to purify and combine them quickly and effectively. One of the most important phases in the preparation of vaccines is the purification operation which aims to eliminate the bacteria associated with the virus in the pulp of the vaccine. The purification, when properly carried out, avoids the possible danger from pathogenic microbes, yields a vaccine which preserves its quality and permits a very rapid application of the preparation.

In the industrial manufacture of vaccines the use of various reagents has been proposed for effecting the purification as, for example, anesthetics, dyes and various other materials.

The object of the present invention is to provide a simple, effective and inexpensive reagent for carrying out the purification process. This reagent is $CCl_3.NO_2$, trichlornitromethane and is applied in the following manner:

The glycerine used to dilute the preparation of vaccine is mixed with a very small quantity of trichlornitromethane. About one part in 1500. Preparations made up with this glycerine mixture are purified within several hours without affecting their essential properties. The glycerine is employed in the usual way and without any special precautions in treating the pulp.

Having now particularly described and ascertained the nature of my said invention and in what manner the same is to be performed, I declare that what I claim is:

1. The method of purifying vaccines which comprises the step of adding glycerine containing a small quantity of trichlornitromethane to the pulp.

2. The method of purifying vaccines which comprises the step of adding a mixture of glycerine, 1500 parts and trichlornitromethane, one part, to the pulp.

3. A composition of matter comprising a virus, glycerine and trichlornitromethane.

4. A diluting mixture for preparing vacinnes comprising glycerine and thichlornitromethane.

5. A diluting mixture for preparing vaccines comprising glycerine, 1500 parts, and trichlornitromethane, one part.

In testimony whereof I affix my signature.
FRANÇOIS BILLON.